US012482939B2

(12) United States Patent
Yang

(10) Patent No.: US 12,482,939 B2
(45) **Date of Patent: *Nov. 25, 2025**

(54) MULTI-FREQUENCY BAND ANTENNA

(71) Applicant: Taoglas Group Holdings Limited, Enniscorthy (IE)

(72) Inventor: Tsai Yi Yang, Tainan (TW)

(73) Assignee: Taoglas Group Holdings Limited, Enniscorthy (IE)

(*) Notice: Subject to any disclaimer, the term of this patent is extended or adjusted under 35 U.S.C. 154(b) by 955 days.

This patent is subject to a terminal disclaimer.

(21) Appl. No.: 17/583,648

(22) Filed: Jan. 25, 2022

(65) Prior Publication Data

US 2022/0224009 A1 Jul. 14, 2022

Related U.S. Application Data

(63) Continuation of application No. 16/685,843, filed on Nov. 15, 2019, now Pat. No. 11,264,718, which is a continuation of application No. 16/172,098, filed on Oct. 26, 2018, now Pat. No. 10,483,644, which is a continuation of application No. 14/948,237, filed on Nov. 20, 2015, now abandoned.

(51) Int. Cl.
*H01Q 5/371* (2015.01)
*H01Q 1/24* (2006.01)

(52) U.S. Cl.
CPC ............. *H01Q 5/371* (2015.01); *H01Q 1/243* (2013.01)

(58) Field of Classification Search
CPC ....... H01Q 1/243; H01Q 5/371; H01L 21/681
See application file for complete search history.

(56) References Cited

U.S. PATENT DOCUMENTS

| | | | | |
|---|---|---|---|---|
| 6,198,442 | B1 | 3/2001 | Rutkowski et al. | |
| 6,323,811 | B1 * | 11/2001 | Tsubaki | H01Q 19/005 343/702 |
| 6,380,895 | B1 | 4/2002 | Moren et al. | |
| 6,693,604 | B2 * | 2/2004 | Washiro | H01Q 1/36 343/702 |

(Continued)

FOREIGN PATENT DOCUMENTS

| | | |
|---|---|---|
| CA | 2887126 | 4/2014 |
| CN | 1485950 | 3/2004 |

(Continued)

*Primary Examiner* — Sean Kayes
(74) *Attorney, Agent, or Firm* — Garson & Gutierrez, PC

(57) ABSTRACT

A multi-frequency band antenna includes a carrier, a high-frequency segment, a low-frequency segment, a printed circuit board (PCB) and an inductor. The high-frequency segment is arranged on left side of the carrier and the low-frequency segment is arranged on right side of the carrier. The radiator on the bottom face of the carrier electrically connects with the micro strip of the PCB and the ground line of the ground metal when the carrier is fixed to the PCB. Moreover, the low-frequency segment is corresponding to a metal face with smaller area such that the low-frequency segment is at a free space to enhance the frequency response of the low-frequency segment and the bandwidth of the high-frequency segment. The area and the volume of blind hole on the carrier can adjust the effective dielectric constant to adjust the resonant frequency and bandwidth of the antenna.

16 Claims, 9 Drawing Sheets

(56) References Cited

U.S. PATENT DOCUMENTS

| | | | | |
|---|---|---|---|---|
| 7,183,980 | B2 | 2/2007 | Chang et al. | |
| 7,557,759 | B2 | 7/2009 | Lin et al. | |
| 7,952,529 | B2 | 5/2011 | Huang et al. | |
| 8,373,599 | B2 * | 2/2013 | Lin | H01Q 9/0421 343/702 |
| 8,754,817 | B1 * | 6/2014 | Kuo | H01Q 1/243 343/702 |
| 8,779,988 | B2 * | 7/2014 | Yang | H01Q 5/371 343/702 |
| 8,970,436 | B2 | 3/2015 | Yang | |
| 9,325,066 | B2 | 4/2016 | Wong et al. | |
| 9,461,359 | B2 | 10/2016 | Kanj et al. | |
| 9,755,310 | B2 | 9/2017 | Quinlan | |
| 9,793,609 | B2 | 10/2017 | Wu et al. | |
| 10,135,129 | B2 | 11/2018 | Zuniga-Juarez | |
| 10,601,135 | B2 | 3/2020 | Yang | |
| 11,081,784 | B2 | 8/2021 | Zuniga-Juarez | |
| 11,088,442 | B2 | 8/2021 | Zuniga-Juarez | |
| 2003/0063033 | A1 * | 4/2003 | Purr | H01Q 1/38 343/702 |
| 2004/0169606 | A1 | 9/2004 | Sato et al. | |
| 2004/0246180 | A1 | 12/2004 | Okado | |
| 2005/0270242 | A1 * | 12/2005 | Qi | H01Q 1/243 343/702 |
| 2007/0229366 | A1 * | 10/2007 | Kim | H01Q 9/42 343/846 |
| 2007/0236394 | A1 | 10/2007 | Aoyama et al. | |
| 2008/0238803 | A1 | 10/2008 | Yang et al. | |
| 2009/0021433 | A1 | 1/2009 | Tsao et al. | |
| 2009/0128420 | A1 * | 5/2009 | Cheng | H01Q 9/0421 343/700 MS |
| 2010/0164827 | A1 | 7/2010 | Miyagawa et al. | |
| 2010/0271271 | A1 * | 10/2010 | Wu | H01Q 5/00 343/702 |
| 2011/0043432 | A1 | 2/2011 | Ineichen et al. | |
| 2011/0156958 | A1 * | 6/2011 | Wong | H01Q 5/378 343/700 MS |
| 2012/0127056 | A1 | 5/2012 | Park et al. | |
| 2012/0169555 | A1 | 7/2012 | Tsou | |
| 2012/0182186 | A1 | 7/2012 | Yang et al. | |
| 2012/0218163 | A1 * | 8/2012 | Wong | H01Q 5/357 343/843 |
| 2013/0257671 | A1 | 10/2013 | Chen et al. | |
| 2015/0155633 | A1 * | 6/2015 | Lee | H01Q 1/243 343/700 MS |
| 2017/0149136 | A1 | 5/2017 | Quinlan | |
| 2017/0149138 | A1 | 5/2017 | Quinlan | |
| 2017/0358861 | A1 | 12/2017 | Quinlan et al. | |

FOREIGN PATENT DOCUMENTS

| | | |
|---|---|---|
| CN | 1518783 | 8/2004 |
| CN | 101308950 | 11/2008 |
| CN | 201440454 | 4/2010 |
| CN | 201994418 | 9/2011 |
| CN | 202042593 | 11/2011 |
| CN | 204067570 | 12/2014 |
| CN | 102544754 | 8/2015 |
| CN | 205122764 | 3/2016 |
| CN | 205159496 | 4/2016 |
| EP | 3154124 | 4/2017 |
| EP | 3154125 | 4/2017 |
| TW | M459541 | 8/2013 |
| TW | 201405936 | 2/2014 |
| TW | 201417399 | 5/2014 |
| TW | M517918 | 2/2016 |
| TW | M519333 U | 3/2016 |
| TW | I553963 | 10/2016 |
| TW | I563735 | 12/2016 |
| TW | 201714353 | 4/2017 |
| WO | 2014058926 | 4/2014 |

* cited by examiner

MULTI-FREQUENCY BAND ANTENNA

PRIORITY

This application is a continuation of, and claims the benefit of priority to, U.S. patent application Ser. No. 16/685,843 filed Nov. 15, 2019, and entitled "Eight-Frequency Band Antenna", which is a continuation of, and claims the benefit of priority to, U.S. patent application Ser. No. 16/172,098 filed Oct. 26, 2018 of the same title, which is a continuation of, and claims the benefit of priority to, U.S. patent application Ser. No. 14/948,237 filed Nov. 20, 2015 of the same title, the contents of each of the foregoing being incorporated herein by reference in its entirety.

BACKGROUND

Field of the Disclosure

The present disclosure relates to an antenna, especially to an eight-frequency band antenna for enhancing the frequency response of the low-frequency segment and bandwidth of the high-frequency segment.

Description of Prior Art

The current commercially available planar inverted-F antenna (PIFA) is generally formed by printing metal material (such as copper) on printed circuit board (PCB) with two-dimensional printing technology. Alternatively, metal membrane is pressed into three-dimensional multi frequency band antenna.

The multi frequency bands signal transmission/reception can be achieved by changing the two-dimensional radiation patterns or the geometric shape of the three-dimensional radiation bodies. However, the antenna formed on PCB or formed by pressing metal membrane into radiation body need a specific volume to ensure signal transmission/reception quality and prevent signal tuning problem caused by environment. Moreover, the electronic device needs an internal space for arranging the PIFA structure; this causes impact on light weight and compact requirement of the electronic devices.

To overcome above problem, the radiation body of the antenna can be fabricated on a rectangular ceramic carrier. As shown in FIG. 1 and FIG. 2, the carrier 101 of the antenna 10 has a high-frequency radiator 102 and a low-frequency radiator 103 on the surface thereof and the carrier 101 is fixed on the PCB 20. The PCB 20 has a ground metal plane 201, a signal feeding micro strip 202 and a ground wire 203 on two faces thereof, where the signal feeding micro strip 202 connects with the ground wire 203 and the radiator of the carrier 101. The high-frequency radiator 102 is arranged on the right side of the carrier 101 and the low-frequency radiator 103 is arranged on the left side of the carrier 101. The antenna 10 is electrically connected to the PCB 20 and the area of the ground metal plane 201 corresponding to the low-frequency radiator 103 is smaller than the area of the ground metal plane 201 corresponding to the high-frequency radiator 102. Therefore, the low-frequency radiator 103 suffers more to the ground shielding and the frequency response (see label A in FIG. 2) is not satisfactory. Moreover, the bandwidth of the high-frequency radiator 102 is not wide enough (only covering 6 bands as shown by label B in FIG. 2). As a result, the signal transmission/reception quality is poor and signal transmission/reception bandwidth is limited.

SUMMARY

In one aspect, a multi-frequency band antenna is disclosed. It is one object of the present disclosure to change the position of the high-frequency segment and the low-frequency segment. The low-frequency segment is corresponding to a smaller area portion of the ground metal face on the PCB when the antenna carrier is fixed to the PCB. Therefore, the low-frequency segment is at a free space to enhance frequency response for the low-frequency segment and the bandwidth for the high-frequency segment.

It is another object of the present disclosure to provide blind holes and ribs in the carrier. The blind holes and the ribs can reduce the overall weight of the carrier 1 and prevent warp of the carrier. The area ratio of the blind holes and the volume ratio of the blind holes can be used to adjust the effective dielectric constant of the carrier, thus adjusting resonant frequency and the bandwidth.

It is still another object of the present disclosure to provide an inductor electrically connecting with the ground line and the micro strip to adjust impedance and provide ground for the antenna, thus forming a PIFA dipole antenna.

Accordingly the present disclosure provides an eight-frequency band antenna, comprising: a carrier being a ceramic rectangular body and comprising a front face, a top face, a back face and a bottom face, the carrier having a plurality of blind holes defined on the front face and concave into the carrier, and at least one rib between two adjacent blind holes; a high-frequency segment arranged on left portions of the front face, the top face, the back face and the bottom face of the carrier if viewing from the front face of the carrier; a low-frequency segment arranged on right portions of the front face, the top face, the back face and the bottom face of the carrier if viewing from the front face of the carrier; a printed circuit board (PCB) having a top side, a left slanting side, a slanting bottom side, a right short side, a recessed side and a right long side, the PCB having a first face and a second face, the first face having a first ground metal face and a micro strip, the micro strip having a front section and a rear section, the front section having a through hole, the micro strip having a front portion extended into the first ground metal face such that a gap is defined between the micro strip and the first ground metal face, the first face of the PCB having an opened area with two fixing ends; an area portion of the first ground metal face, which is from the left slanting side to the gap being larger than an area portion of the first ground metal face, which is from the recessed side to the gap, a ground line extended on the smaller area portion of the first ground metal face extended from the recessed side to the gap, a separation defined between the ground line and the rear section of the micro strip, the first face having an opened area with two fixed ends; an inductor arranged across the separation with one end electrically connecting with the rear section of the micro strip and another end electrically connecting with the ground line, wherein the two fixed ends of the opened area of the first face are fixed to the bottom face of the carrier such that the low-frequency segment is corresponding the recessed side and corresponding to the smaller area portion of the first ground metal face extended from the recessed side to the gap and the low-frequency segment is at a free space to enhance a frequency response of the low-frequency segment and to enhance a bandwidth of the high-frequency segment.

According to one aspect of the present disclosure, an area ratio of the blind holes on the front face and a volume ratio of the blind holes with respect to the carrier is adjustable to adjust an effective dielectric constant of the carrier, thus adjusting resonant frequency and the bandwidth.

According to another aspect of the present disclosure, the area ratio of the blind holes on the front face is 30%-50%.

According to still another aspect of the present disclosure, the area ratio of the blind holes on the front face is 40%.

According to still another aspect of the present disclosure, the volume ratio of the blind holes with respect to the carrier is 20%-30%.

According to still another aspect of the present disclosure, the volume ratio of the blind holes with respect to the carrier is 24%.

According to still another aspect of the present disclosure, the high-frequency segment has a double-T shaped radiator, a first L-shaped radiator, a straight shape radiator, a winding radiator and a second L-shaped radiator, the double-T shaped radiator being arranged on of the front face, the top face, the back face and the bottom face of the carrier, and a portion of the double-T shaped radiator, which is arranged on the on the bottom face being used as fixed point for PCB, a bottom part of the double-T shaped radiator electrically connects with one end of a short side of the first L-shaped radiator is arranged on the bottom face, the other end of the short side of the first L-shaped radiator electrically connects with the straight shape radiator arranged on the front face and the bottom face, the straight shape radiator electrically connecting with the micro strip, a long side of the first L-shaped radiator arranged on the top face and the back face coupled to the winding radiator arranged on the top face and the back face, the second L-shaped radiator being arranged on the front face and the bottom face, a short side of the second L-shaped radiator being parallel to the straight shape radiator, a long side of the second L-shaped radiator being vertical to the straight shape radiator and parallel to the winding radiator, the long side of the second L-shaped radiator electrically connected with the ground line.

According to still another aspect of the present disclosure, the high-frequency segment provides a fourth frequency band, a fifth frequency band, a sixth frequency band, a seventh frequency band, and an eighth frequency band, and the fourth frequency band, the fifth frequency band, the sixth frequency band, the seventh frequency band, and the eighth frequency band are within 1710 MHZ about 2700 MHZ.

According to still another aspect of the present disclosure, pitches of the winding radiator are around 0.15 mm about 0.3 mm to provide LC resonance with 2400 MHZ about 2700 MHZ resonant frequency.

According to still another aspect of the present disclosure, the low-frequency segment comprising a first rectangular radiator, a second rectangular radiator, a third rectangular radiator and a fourth rectangular radiator arranged respectively the front face, the top face, the back face and the bottom face of the carrier and having different areas, the third rectangular radiator arranged on the back face is fixed point with the PCB.

According to still another aspect of the present disclosure, the low-frequency segment provides a first frequency band, a second frequency band, and a third frequency band, and the first frequency band, the second frequency band, and the third frequency band are within 700 MHZ about 960 MHZ.

According to still another aspect of the present disclosure, the second face has a second ground metal face, the through hole is opened to the second ground metal face and electrically connects with a signal feeding end of a coaxial cable, the second ground metal face electrically connects with a ground end of the coaxial cable.

BRIEF DESCRIPTION OF THE DRAWINGS

The present disclosed example itself, however, may be best understood by reference to the following detailed description of the present disclosed example, which describes an exemplary embodiment of the present disclosed example, taken in conjunction with the accompanying drawings, in which.

DETAILED DESCRIPTION

Figure 1:
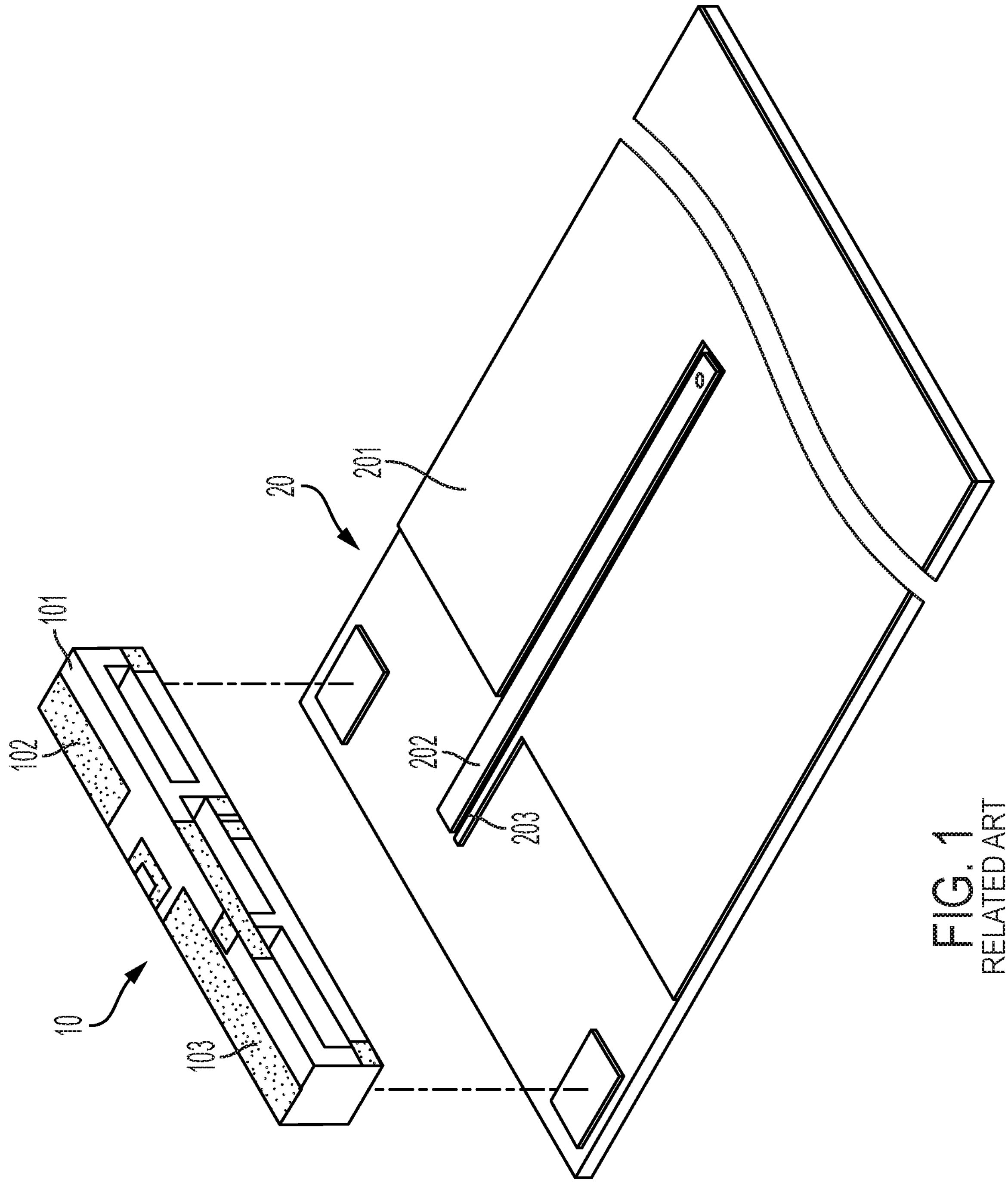
FIG. 1 RELATED ART
FIG. 1 shows a conventional multi-band antenna.
Figure 2:
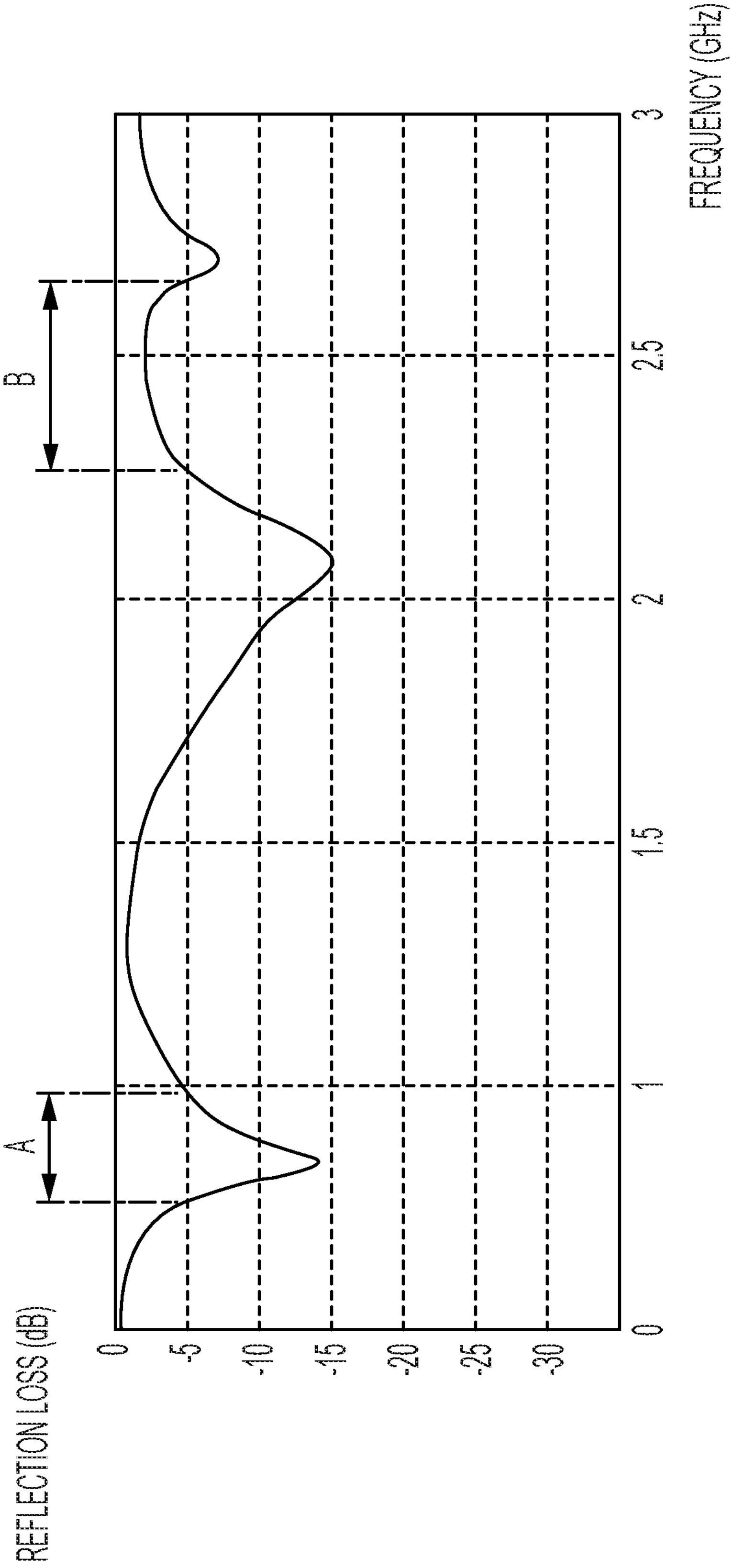
FIG. 2 RELATED ART
FIG. 2 shows the reflection coefficients of the multi-band antenna in FIG. 1.
Figure 4:
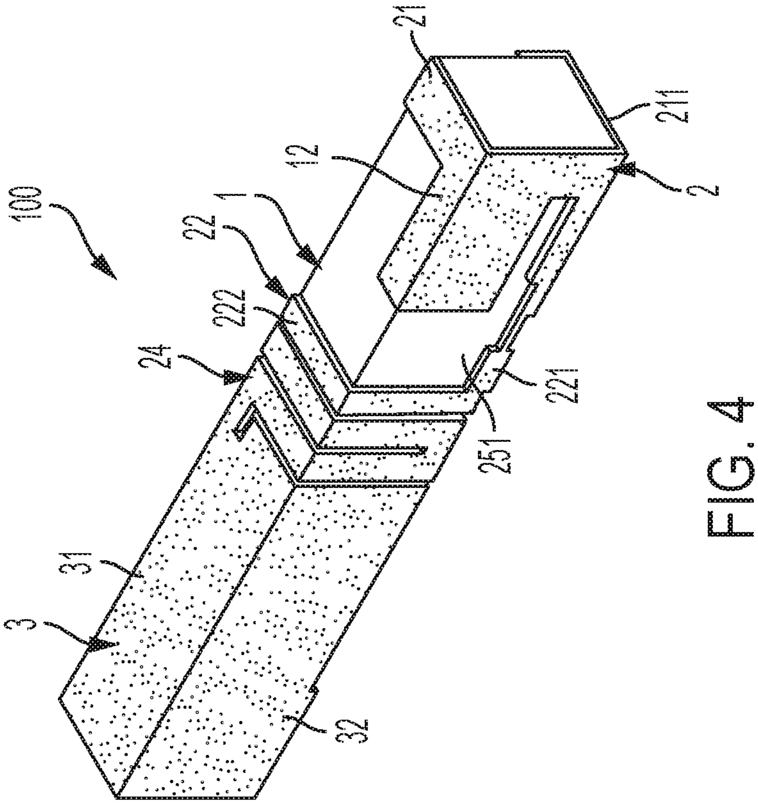
FIG. 4 shows the top perspective view of the carrier of the eight-frequency band antenna according to the present disclosure.
Figure 3:
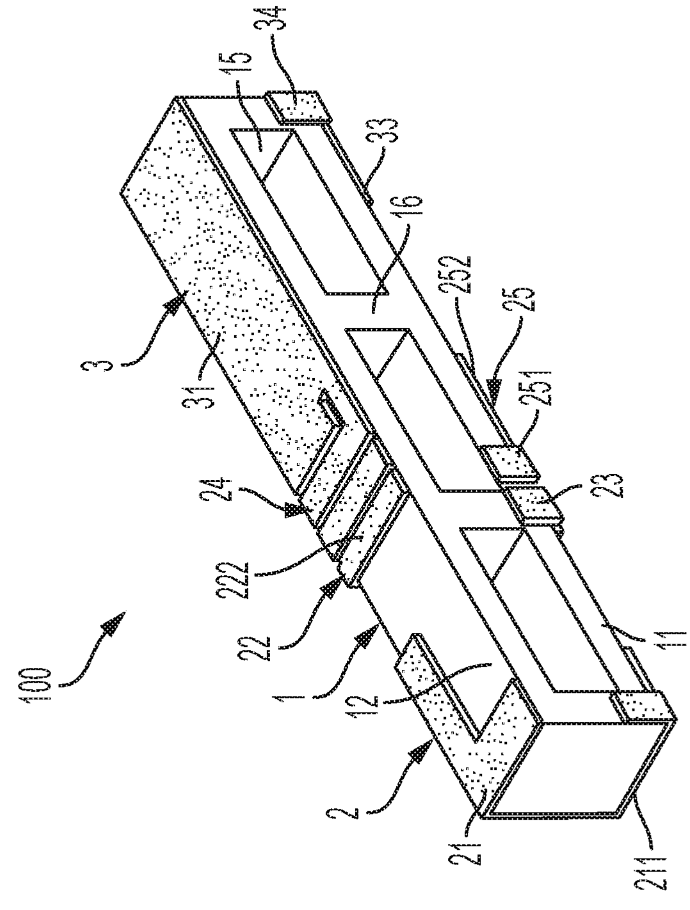
FIG. 3 shows the front perspective view of the carrier of the eight-frequency band antenna according to the present disclosure.
Figure 6:
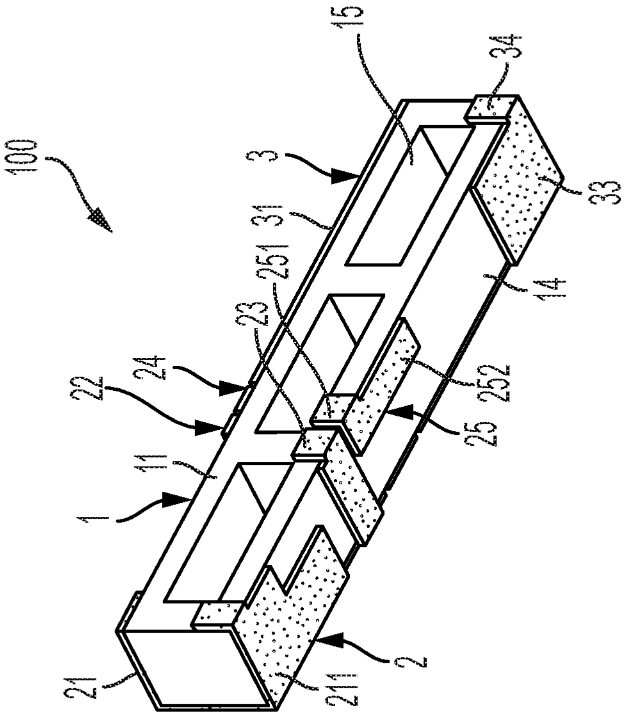
FIG. 6 shows the back perspective view of the carrier of the eight-frequency band antenna according to the present disclosure.
Figure 5:
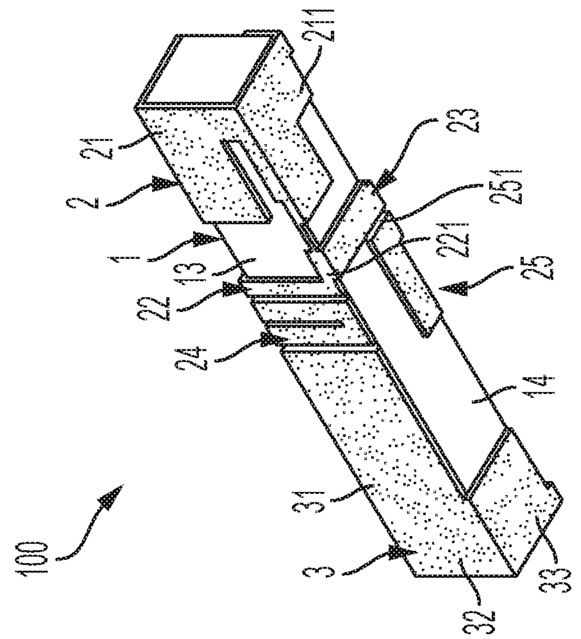
FIG. 5 shows the back perspective view of the carrier of the eight-frequency band antenna according to the present disclosure.
Figure 7:
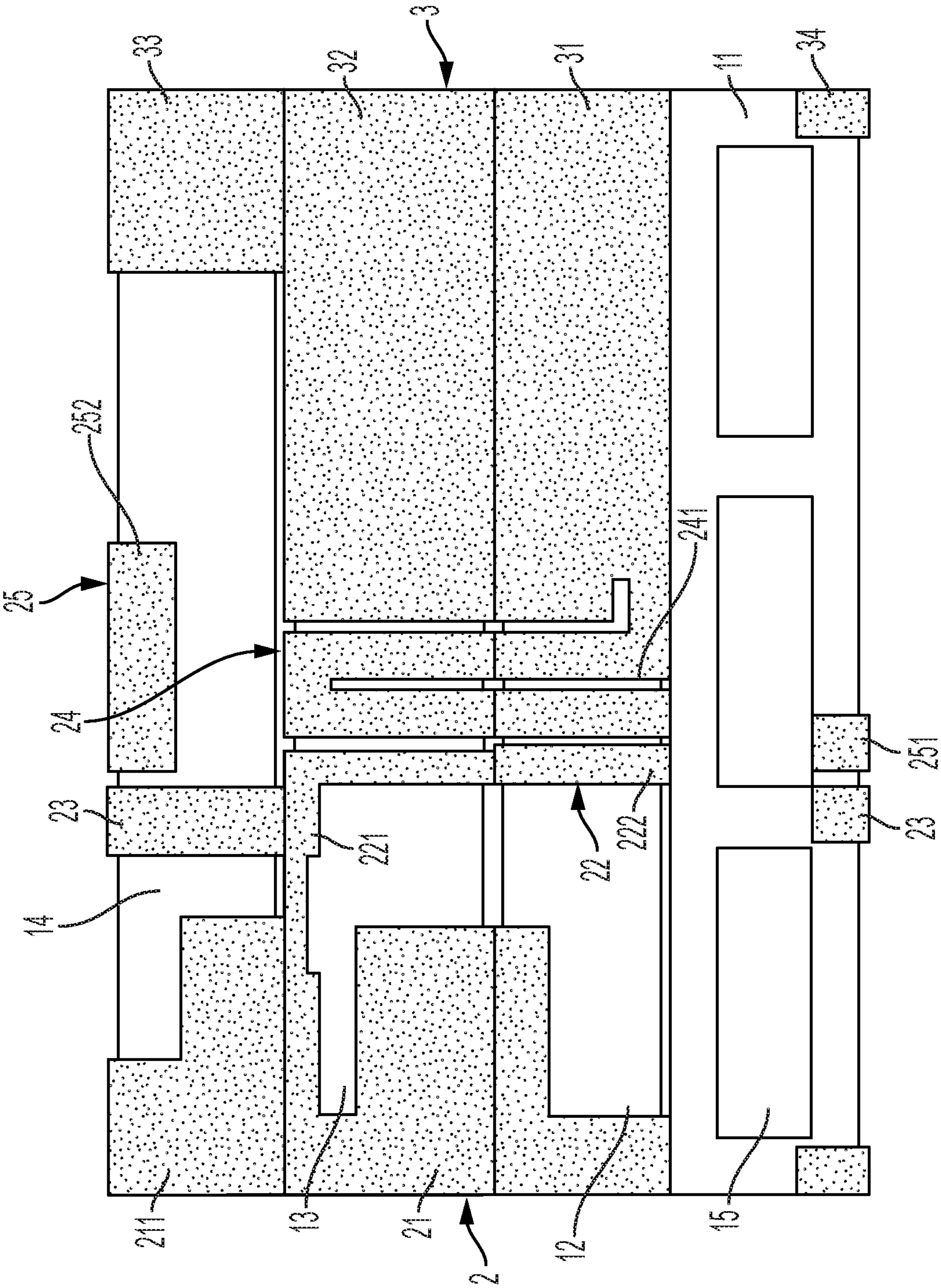
FIG. 7 shows a planar view of the metal radiators of the carrier of the eight-frequency band antenna according to the present disclosure.

FIG. 3 shows the front perspective view of the carrier 1 of the eight-frequency band antenna 100 according to the present disclosure; FIG. 4 shows the top perspective view of the carrier 1 of the eight-frequency band antenna 100 according to the present disclosure; FIG. 5 shows the back perspective view of the carrier 1 of the eight-frequency band antenna 100 according to the present disclosure; FIG. 6 shows the back perspective view of the carrier 1 of the eight-frequency band antenna 100 according to the present disclosure; and FIG. 7 shows a planar view of the metal radiators of the carrier 1 of the eight-frequency band antenna 100 according to the present disclosure. The eight-frequency band antenna 100 according to the present disclosure comprises a carrier 1, a high-frequency segment 2, and a low-frequency segment 3.

The carrier 1 is a ceramic rectangular body with a front face 11, a top face 12, a back face 13 and a bottom face 14. The front face 11 has a plurality of blind holes 15 defined thereon which form a three-dimensional cavity in the carrier 1 and each two blind holes have at least one rib 16 therebetween. The blind holes 15 and the ribs 16 can reduce the overall weight of the carrier 1 and prevent warp of the carrier 1. The area ratio of the blind holes 15 on the front face 11 and the volume ratio of the blind holes 15 with respect to the carrier 1 can be used to adjust the effective dielectric constant of the carrier 1, thus adjusting resonant frequency and the bandwidth. The area ratio of the blind holes 15 on the front face 11 is around 30%-50%, and more particularly can be 40%. The volume ratio of the blind holes 15 with respect to the carrier 1 is 20%-30% and more particularly can be 24%. Moreover, the shape and the symmetric degree of the blind holes 15 can also be adjusted.

When viewing from the front face 11 of the carrier 1, the high-frequency segment 2 is arranged on the left side of the carrier 1 and has a double-T shaped radiator 21, a first L-shaped radiator 22, a straight shape radiator 23, a winding radiator 24 and a second L-shaped radiator 25. The double-T shaped radiator 21 is arranged on edges of the front face 11, the top face 12, the back face 13 and the bottom face 14, and is used as fixed point for PCB 4. The bottom of one T of the double-T shaped radiator 21 electrically connects with one end of a short side 221 of the first L-shaped radiator 22. The double-T shaped radiator 21 is arranged on the bottom face 14 and the back face 13. The short side 221 of the first L-shaped radiator 22 electrically connects with the straight shape radiator 23 arranged on the front face 11 and the bottom face 14. The long side 222 of the first L-shaped radiator 22 is positioned on two surfaces of the carrier 1 adjacent the winding radiator 24. In the embodiment shown, the straight shape radiator 23 functions as signal feeding point. The long side 222 of the first L-shaped radiator 22, which is arranged on the top face 12 and the back face 13 couples to the winding radiator 24, which is arranged on the top face 12 and the back face 13. The winding radiator 24 has an L-shaped gap along a length adjacent the first rectangular radiation body 31 and the second rectangular radiation body 32. The pitches of the winding radiator 24 are around 0.15 mm about 0.3 mm to provide LC resonance with 2400 MHZ about 2700 MHZ resonant frequency. The second L-shaped radiator 25 is arranged on the front face 11 and the bottom face 14. The short side 251 of the second L-shaped radiator 25 is parallel to the straight shape radiator 23, the long side 252 of the second L-shaped radiator 25 is vertical to the straight shape radiator 23 and parallel to the winding radiator 24. In the shown embodiment, the longer side 252 of the second L-shaped radiator 25 is used as ground end. In the shown embodiment, high-frequency segment 2 provides the fourth frequency band, the fifth frequency band, the sixth frequency band, the seventh frequency band and the eighth frequency band. The frequency range of the fourth frequency band, the fifth frequency band, the sixth frequency band, the seventh frequency band and the eighth frequency band is between 1710 MHZ and 2700, and can be used in GSM, WCDMA, WIFI, and LTE communication system.

When viewing from the front face 11 of the carrier 1, the low-frequency segment 3 is arranged on the right side of the carrier 1 and has a first rectangular radiation body 31, a second rectangular radiation body 32, a third rectangular radiation body 33 and a fourth rectangular radiation body 34, where each of the rectangular radiation bodies has different area and is respectively arranged on the top face 12, the back face 13, the bottom face 14, and the front face 11 of the carrier 1.

The third rectangular radiation body 33 of the low-frequency segment 3 provides fixing points with the printed circuit board. In the embodiment shown, the low-frequency segment 3 provides the first frequency band, the second frequency band, and the third frequency band. The frequency range of the first frequency band, the second frequency band, and the third frequency band is between 700 MHZ and 960 MHZ, and can be used in LTE and GMS communication system.

Figure 8:
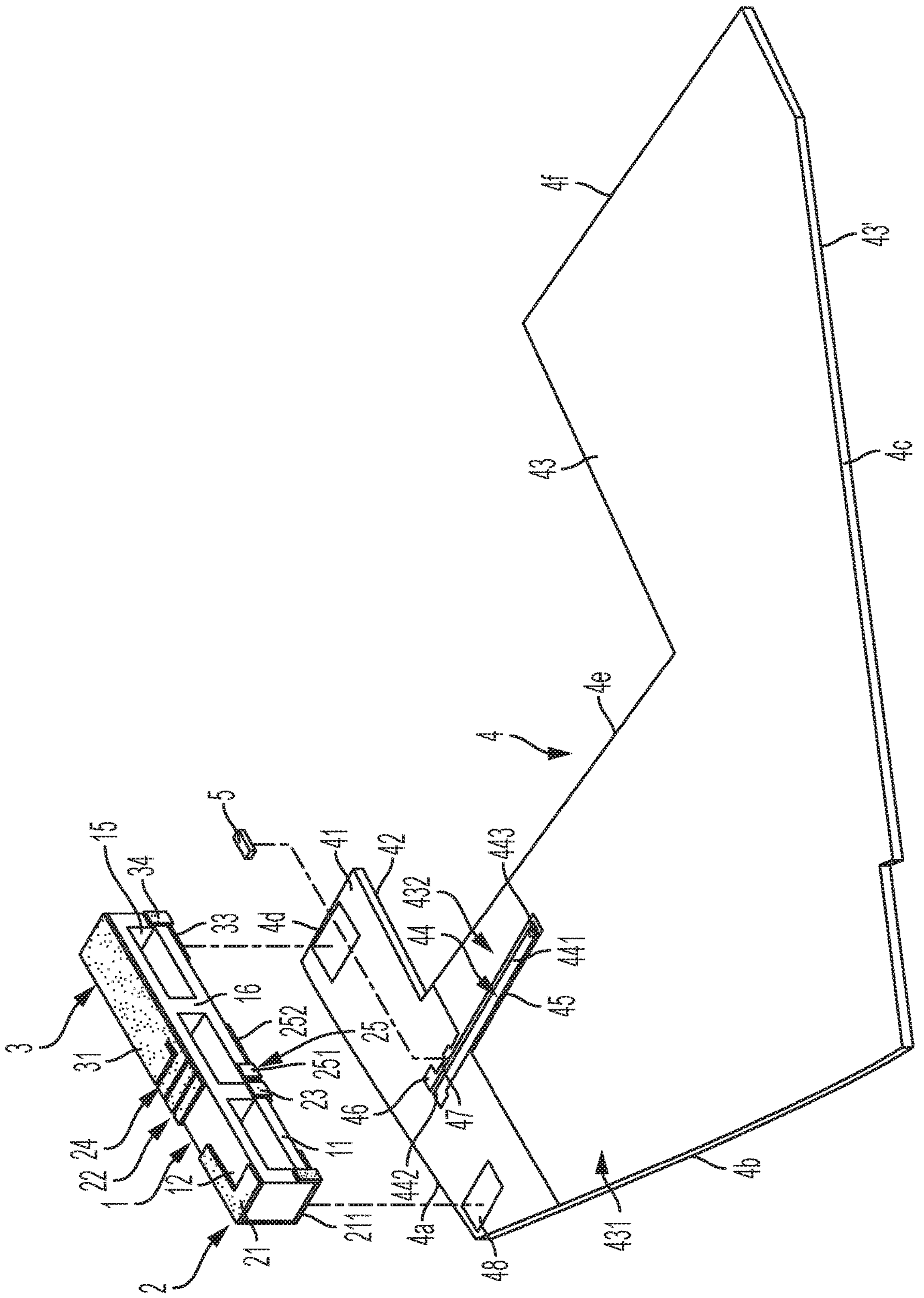
FIG. 8 shows the exploded view of the eight-frequency band antenna and the PCB.
Figure 9:
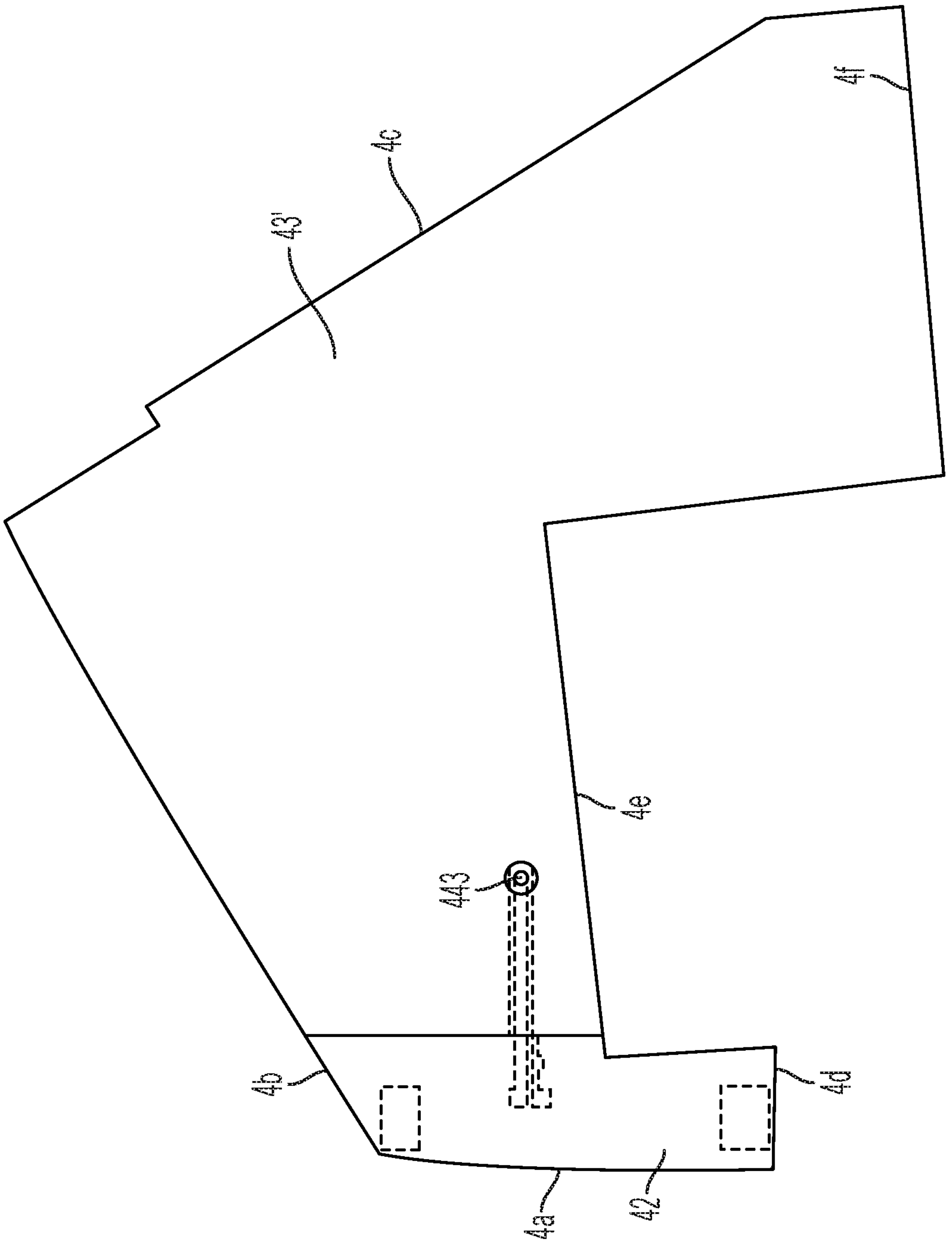
FIG. 9 shows the backside view of the eight-frequency band antenna and the PCB.
Figure 10:
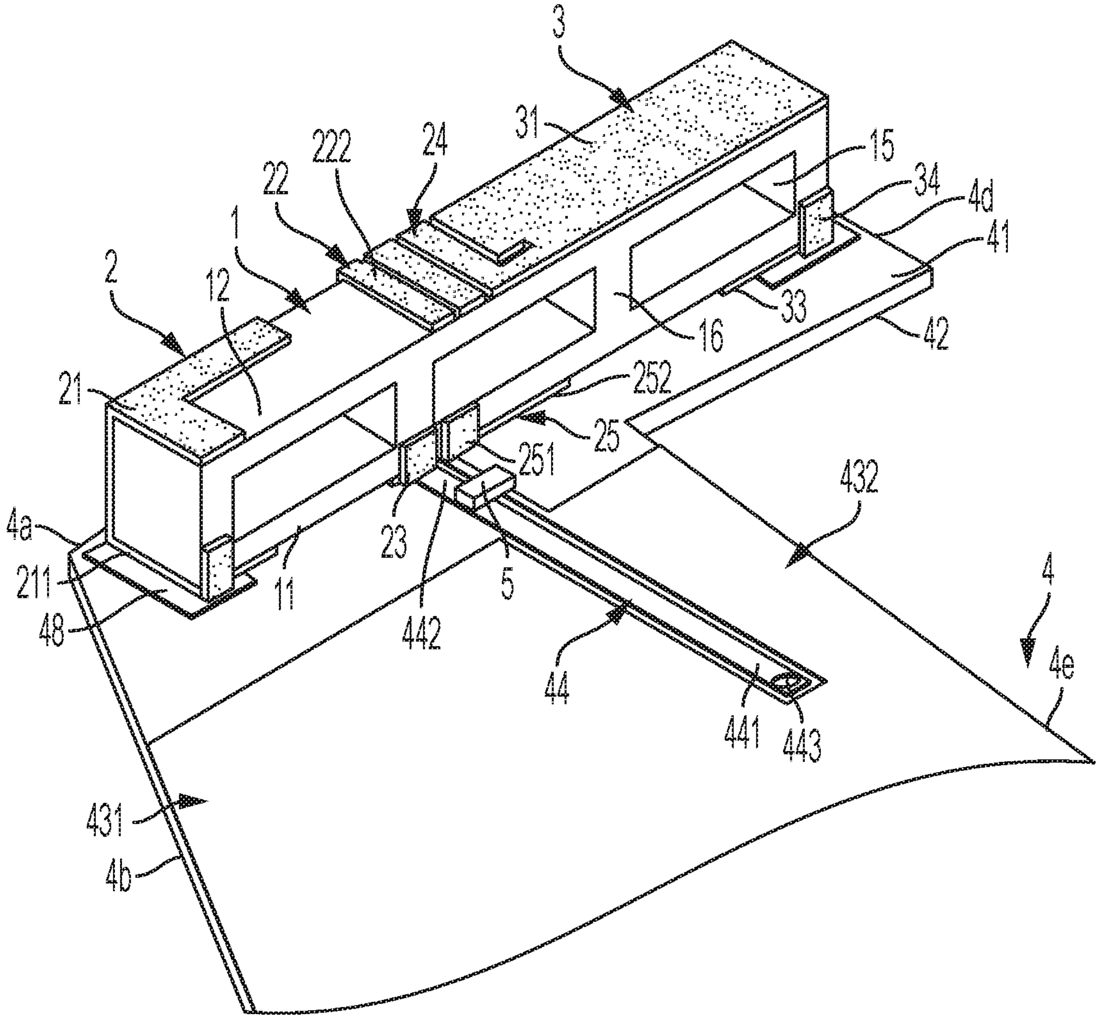
FIG. 10 shows the electric connection of the eight-frequency band antenna and the PCB.

FIGS. 8-10 show the exploded view, the backside view and the electric connection of the eight-frequency band antenna and the PCB 4. The eight-frequency band antenna further comprises a PCB 4 fixed to the carrier 1 and the PCB has, in connection sequence, a top side 4*a*, a left slanting side 4*b*, a bottom slanting side 4*c*, a right short side 4*d*, a recessed side 4*e* and a right long side 4*f* Moreover, the PCB 4 has a first face 41 and a second face 42. The first face 41 has a first ground metal face 43 and a micro strip 44. The micro strip 44 has a front section 441 and a rear section 442. The front section 441 has a through hole 443 and extends into the first ground metal face 43 such that a gap 45 is defined between the front section 441 and the first ground metal face 43. Moreover, the area portion 431 of the first ground metal face 43, which is from the left slanting side 4*b* to the gap 45, is larger than the smaller area portion 432 of the first ground metal face 43, which is from the recessed side 4*e* to the gap 45.

Moreover, a ground line 46 is extended on the smaller area portion 432 of the first ground metal face 43, which is from the recessed side 4*e* to the gap 45. The ground line 46 is parallel to the rear section 442 of the micro strip 44. A separation 47 is defined between the ground line 46 and the rear section 442 of the micro strip 44. An inductor 5 is connected between the ground line 46 and the rear section 442 of the micro strip 44 and cross the separation 47 to adjust impedance and provide ground for the antenna, thus forming a PIFA dipole antenna. The opened area of the first face 41 has two corresponding fixed ends 48 for fixed connection with the portion 211 of the double-T shaped radiator 21 on the on the bottom face 14 and the third rectangular radiation body 33.

The second face 42 further has a second ground metal face 43', where the through hole 443 is opened to the second ground metal face 43' and electrically connects with a signal feeding end (not shown) of a coaxial cable. The second ground metal face 43' electrically connects with the ground end of the coaxial cable.

When the carrier 1 is fixed to the PCB 4, the two fixed ends 48 are fixed to the portion 211 of the double-T shaped radiator 21 on the on the bottom face 14 and the third rectangular radiation body 33 respectively. The straight shape radiator 23 on the bottom face 14 electrically connects the micro strip 44. The long side 222 of the L-shaped radiator 24 electrically connects with the ground line 46. After fixing the carrier 1, the low-frequency segment 3 is arranged on the opened area and corresponding to the recessed side 4*e* of the PCB 4 and corresponding to the smaller area portion 432 of the first ground metal face 43 such that the low-frequency segment 3 is located at a free space to enhance the frequency response of the low-frequency segment 3.

Figure 11:
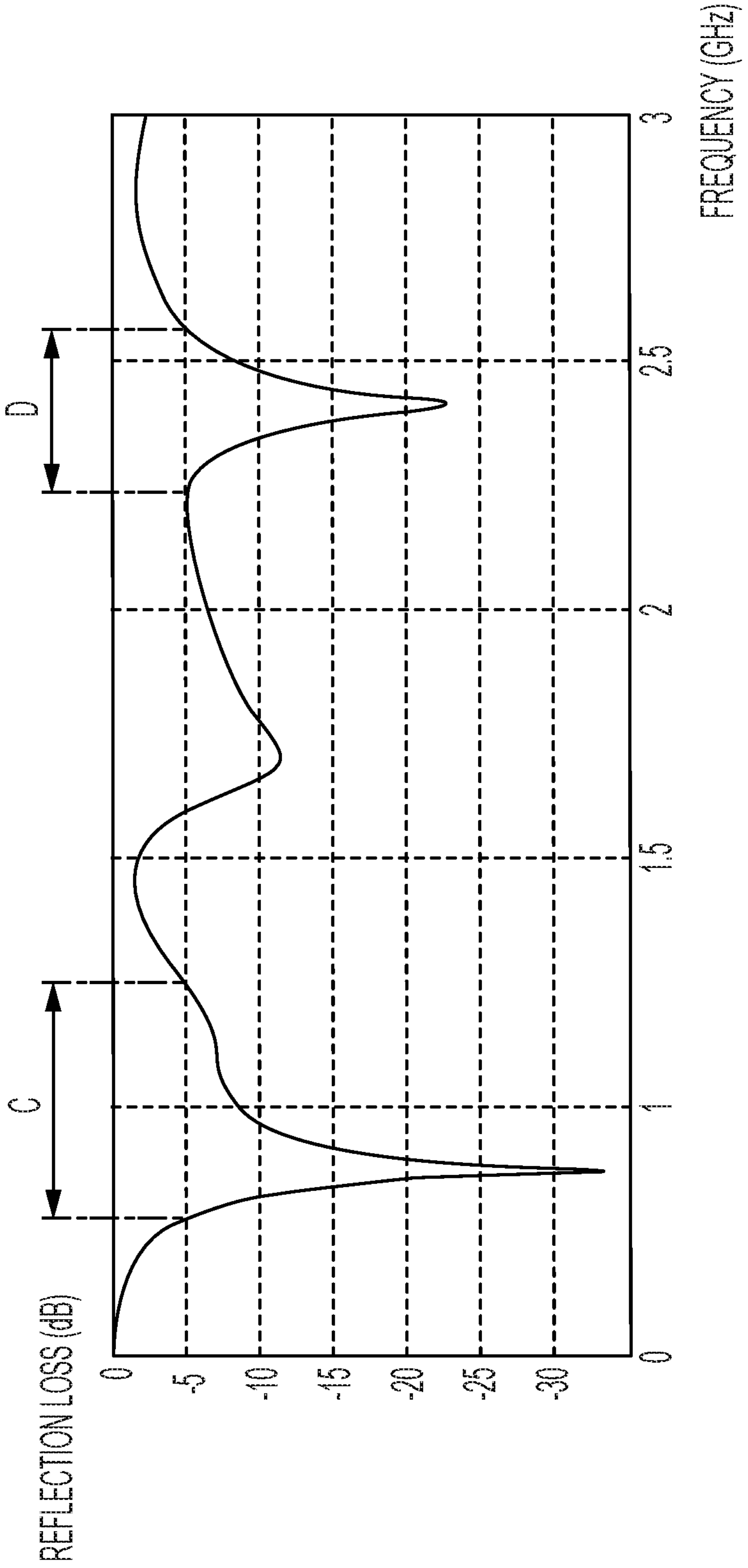
FIG. 11 shows the reflection loss curve of the eight-frequency band antenna of the present disclosure.

FIG. 11 shows the reflection loss curve of the ten-frequency band antenna of the present disclosure. With reference also to FIG. 10, after fixing the carrier 1 to the PCB 4, the low-frequency segment 3 is arranged on the opened area and corresponding to the recessed side 4*e* of the PCB 4 and the smaller area portion 432 of the first ground metal face 43 such that the low-frequency segment 3 is at a free space with less shielding. The eight-frequency band antenna of the present disclosure has better frequency response for the low-frequency segment 3 (reflection loss over frequency C) and higher bandwidth for the high-frequency segment 2 (reflection loss over frequency D). Moreover, the low-frequency segment 3 provides the first frequency band, the second frequency band, and the third frequency band. The frequency range of the first frequency band, the second frequency band, and the third frequency band is between 700 MHZ and 960 MHZ, and can be used in LTE and GMS communication. The high-frequency segment 2 provides the fourth frequency band, the fifth frequency band, and the sixth frequency band with frequency range between 1710 MHZ and 2710 MHZ and can be used in GSM and WCDMA communication. The high-frequency segment 2 provides the seventh frequency band with frequency range 2400 MHZ about 2500 MHZ and used in WIFI communication and the eighth frequency band with frequency range 2600 MHZ about 2700 MHZ used in LTE communication.

The foregoing descriptions of embodiments of the disclosed example have been presented only for purposes of illustration and description. They are not intended to be exhaustive or to limit the disclosed example to the forms disclosed. Accordingly, many modifications and variations will be apparent to practitioners skilled in the art. Additionally, the above disclosure is not intended to limit the disclosed example. The scope of the disclosed example is defined by the appended.

What is claimed is:

1. A multiple frequency band antenna, comprising:

a carrier, the carrier having a front face, a top face, a back face, a bottom face, a first end face and a second end face opposite the first end face;

a high-frequency radiating segment, the high-frequency radiating segment extending across each of the front face, the top face, the back face, and the bottom face of the carrier; and a low-frequency radiating segment, the low-frequency radiating segment extending across each of the front face, the top face, the back face, and the bottom face of the carrier, the low-frequency radiating segment being disposed adjacent the high-frequency radiating segment;

wherein the high-frequency radiating segment comprises an L-shaped portion of conductor on the top face of the carrier, the L-shaped portion of conductor extending along a side edge of the top face of the carrier and along a back edge of the top face of the carrier; and wherein the low-frequency radiating segment comprises a rectangular portion of conductor on the top face of the carrier, the rectangular portion of conductor extending along another side edge of the top face of the carrier, along the back edge of the top face of the carrier, and along a front edge of the top face of the carrier, the rectangular portion of conductor further comprising an L-shaped non-conductive gap, the L-shaped non-conductive gap extending from the back edge of the top face of the carrier towards the front edge of the top face of the carrier and stopping at an intermediary portion of the top face.

2. The antenna of claim 1, wherein the high-frequency radiating segment comprises a winding radiating segment extending along portions of the top face and the back face of the carrier.

3. The antenna of claim 1, wherein a first edge portion extends along portions of each of the bottom face and the back face of the carrier adjacent the first end face of the carrier and a second perpendicular portion extends perpendicular to the first edge portion.

4. The antenna of claim 1, wherein the high-frequency radiating segment comprises a straight radiating segment extending along portions of the front face and the bottom face of the carrier.

5. The antenna of claim 1, wherein the high-frequency radiating segment comprises a first L-shaped radiating segment extending along portions of the top face and the back face of the carrier.

6. The antenna of claim 5, wherein the high-frequency radiating segment additionally comprises a second L-shaped radiating segment extending along portions of the bottom face and the front face of the carrier.

7. The antenna of claim 1, additionally comprising a printed circuit board comprising a top side, a left slanting side, a slanting bottom side, and a right long side, a recessed side, and a right short side, with a first face and a second face, the first face having a first ground metal face, a micro strip and an open area with two fixed ends, the micro strip having a front section and a rear section, wherein the front section extends into the first ground metal face such that a gap is defined between the micro strip and the first ground metal face and comprises a through hole.

8. The antenna of claim 1, further comprising:

a plurality of recesses in the front face of the carrier; and a rib extending between two of the plurality of recesses.

9. A multiple frequency band antenna, comprising:

a carrier, the carrier having a front face, a top face, a back face, a bottom face, a first end face and a second end face opposite the first end face;

a high-frequency radiating segment, the high-frequency radiating segment extending across each of the front face, the back face, and the bottom face of the carrier; and a low-frequency radiating segment, the low-frequency radiating segment extending across each of the front face, the back face, and the bottom face of the carrier, the low-frequency radiating segment being located adjacent the high-frequency radiating segment;

wherein the high-frequency radiating segment comprises an L-shaped portion of conductor on the top face of the carrier, the L-shaped portion of conductor extending along a side edge of the top face of the carrier and along a back edge of the top face of the carrier; and wherein the low-frequency radiating segment comprises a rectangular portion of conductor on the top face of the carrier, the rectangular portion of conductor extending along another side edge of the top face of the carrier, along the back edge of the top face of the carrier, and along a front edge of the top face of the carrier, the rectangular portion of conductor further comprising an L-shaped non-conductive gap, the L-shaped non-conductive gap extending from the back edge of the top face of the carrier towards the front edge of the top face of the carrier and stopping at an intermediary portion of the top face.

10. The antenna of claim 9, wherein the high-frequency radiating segment comprises a winding radiating segment extending along portions of the back face of the carrier.

11. The antenna of claim 9, wherein a first edge portion extends along portions of each of the bottom face and the back face of the carrier adjacent the first end face of the carrier.

12. The antenna of claim 9, wherein the high-frequency radiating segment comprises a straight radiating segment extending along portions of the front face and the bottom face of the carrier.

13. The antenna of claim 9, wherein the high-frequency radiating segment comprises a first L-shaped radiating segment extending along portions of the back face of the carrier.

14. The antenna of claim 13, wherein the high-frequency radiating segment additionally comprises a second L-shaped radiating segment extending along portions of the bottom face and the front face of the carrier.

15. The antenna of claim 9, additionally comprising a printed circuit board comprising a top side, a left slanting side, a slanting bottom side, and a right long side, a recessed side, and a right short side, with a first face and a second face, the first face having a first ground metal face, a micro strip and an open area with two fixed ends, the micro strip having a front section and a rear section, wherein the front section extends into the first ground metal face such that a gap is defined between the micro strip and the first ground metal face and comprises a through hole.

16. The antenna of claim 9, further comprising:

a plurality of recesses in the front face of the carrier; and a rib extending between two of the plurality of recesses.

* * * * *